US011186371B2

(12) United States Patent
Lasell

(10) Patent No.: US 11,186,371 B2
(45) Date of Patent: Nov. 30, 2021

(54) ENERGY ABSORBING ASSEMBLY FOR PASSENGER SEATS

(71) Applicant: Safran Seats USA LLC, Gainesville, TX (US)

(72) Inventor: Donald M. Lasell, Denton, TX (US)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 17/290,037

(22) PCT Filed: Oct. 31, 2018

(86) PCT No.: PCT/US2018/058397
§ 371 (c)(1),
(2) Date: Apr. 29, 2021

(87) PCT Pub. No.: WO2020/091755
PCT Pub. Date: May 7, 2020

(65) Prior Publication Data
US 2021/0316865 A1    Oct. 14, 2021

(51) Int. Cl.
*B64D 11/06* (2006.01)
(52) U.S. Cl.
CPC ........ *B64D 11/0619* (2014.12); *B64D 11/064* (2014.12)
(58) Field of Classification Search
CPC ........................... B64D 11/0619; B64D 11/064
USPC ......................................... 297/216.1, 216.18
See application file for complete search history.

(56) References Cited

U.S. PATENT DOCUMENTS

| 3,806,191 | A | * | 4/1974 | Stegmaier | ................ | B60N 2/06 297/216.18 |
| 4,109,959 | A | * | 8/1978 | Barecki | ................ | B60N 2/242 297/216.18 |
| 5,685,603 | A | * | 11/1997 | Lane, Jr. | ............... | B60N 2/2821 297/216.18 |
| 5,730,492 | A |   | 3/1998 | Warrick et al. | | |

FOREIGN PATENT DOCUMENTS

EP    3381805 A1    10/2018
WO   2017044169 A1   3/2017

OTHER PUBLICATIONS

International Patent Application No. PCT/US2018/058397, International Search Report and Written Opinion, dated May 7, 2019.

* cited by examiner

Primary Examiner — Anthony D Barfield
(74) Attorney, Agent, or Firm — Kilpatrick Townsend & Stockton LLP

(57) ABSTRACT

An energy absorbing assembly for a passenger seat that includes a crushable energy absorbing element for safely capturing kinetic energy during an impact event. The energy absorbing assembly comprises a linkage which is mechanically connected with moving parts of the seat back or seat pan by a first attachment element and a second attachment element, and the linkage includes an extended portion that extends beyond one of the attachment elements. A crushable energy absorbing element is mounted around the extended portion of the linkage and connected thereto, so that the crushable energy absorbing element receives and absorbs energy by deformation when the seat back is pushed forward with sufficiently high energy.

15 Claims, 6 Drawing Sheets

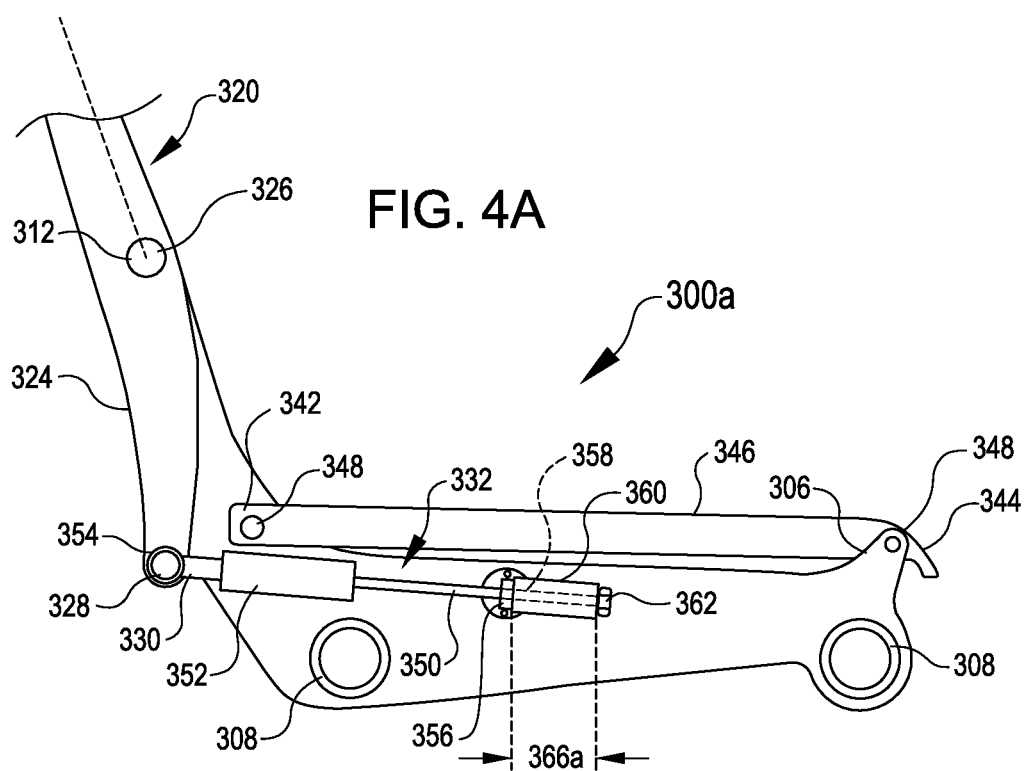
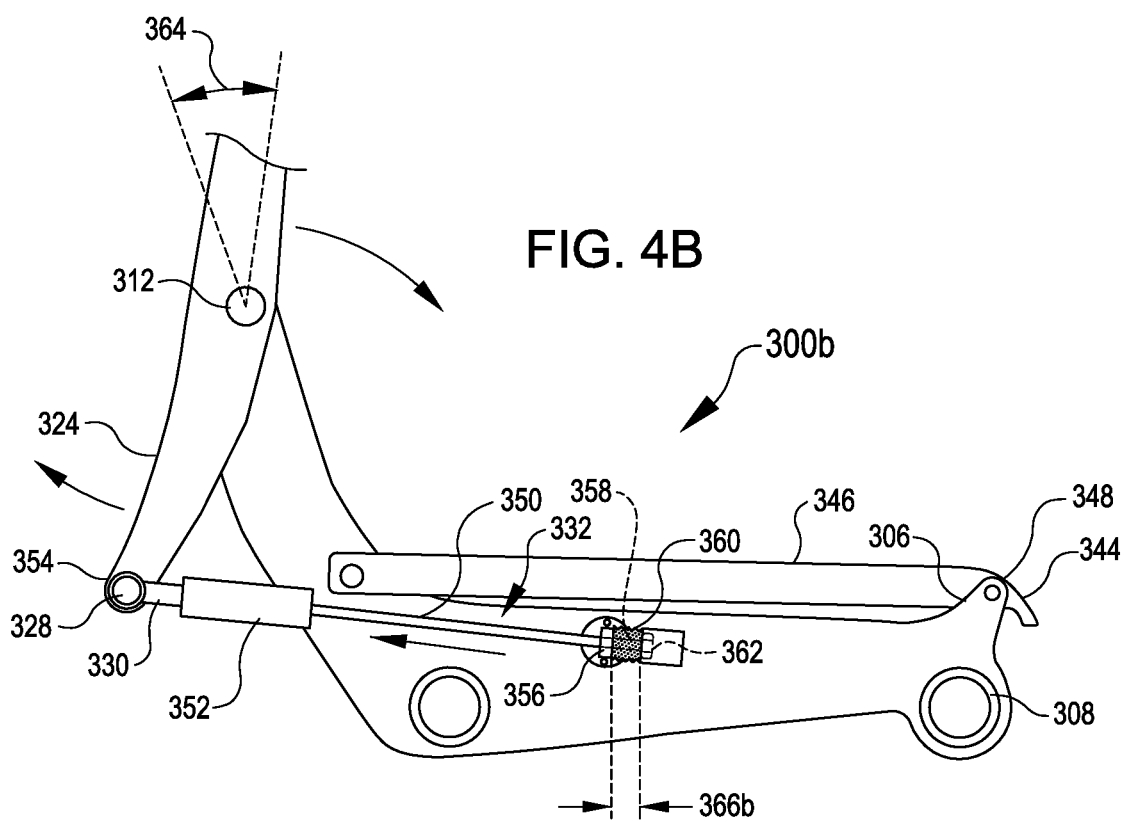

ENERGY ABSORBING ASSEMBLY FOR PASSENGER SEATS

The field of the invention relates to safety devices for passenger seats.

BACKGROUND

In commercial aircraft, passenger safety and particularly the prevention of head injury are of paramount importance, with various structures directed to providing secure seating and avoiding passenger head impact with hard surfaces in turbulent or impact conditions. Unlike ground-based transport, air transport must cope with higher speeds and more limited space and weight constraints for safety devices. In existing aircraft designs, passenger seat backs are designed to break away when subjected to sudden force indicating passenger impact, however, such mechanisms may redirect kinetic energy or create unexpected hazards for passengers. Due to these and other structural and safety concerns, improved solutions for passenger impact safety are needed.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present disclosure, an energy absorbing assembly for a passenger seat includes a recline lock assembly having first and second ends, one of which is attached with a movable part of the seat pan or seat back that can actuate when the seat reclines, and the other of which is attached with a rigid structural element of the passenger seat or seat frame. An extended portion of the linkage passes through and extends beyond one of the attachment element when positioned therethrough, and a crushable energy absorbing element is mounted around the extended portion of the linkage and fixed relative to the end of the linkage. The energy absorbing element is positioned and configured to receive compressive force between the end of the linkage and one of the attachment elements when the seat back is pushed forward with sufficient force, e.g., as may occur during a collision event.

According to some embodiments, the crushable energy absorbing element is a cylindrical energy absorber having an internal opening sized to accommodate the linkage, a crushable matrix surrounding the internal opening, and an external shell that contains the crushable matrix when the matrix is compressed. However, a variety of specific configurations of the energy absorbing element are possible without deviating from the principles described herein. For example, energy absorbing elements can function without an external shell, and are not necessarily cylindrical. Suitable energy absorbing elements can include a crushable matrix in any suitable shape that can be deformed by compressive force, and can also include varying cross-sectional areas over the length of the energy absorbing element, e.g. stepped, conical, or otherwise shaped. Various dimensions and constructions of the energy absorber can be used to achieve specific energy absorbing profiles, or to fit assemblies having a variety of travel. For example, specific energy absorbing elements can range in length from about 2.5-25 cm (1-10"), or 5-12.5 cm (2-5"), or longer, and may be able to compress by up to 60% of their initial length (i.e., to a final state that is 40% of the initial length), by up to 75% of their initial length, or more. Suitable crushable energy absorbing devices may be operable to absorb energy by plastic deformation when subjected to a crushing force of 6.67 kN (1500 lb. force), 5.0 kN (1,125 lb. force), or as little as 2.6 kN (600 lb. force) in compression. In addition, some embodiments of energy absorbing assemblies can include multi-stage energy absorbing elements and/or shaped energy absorbing elements (e.g., conical or partially conical, or having an otherwise varying cross-sectional area) that provide an increasing or nonlinear energy absorbing profile, e.g., resisting initial deformation only, gradually increasing in resistance to deformation, increasing in resistance to deformation according to one or more steps, or other profiles.

According to some embodiments, the linkage to which the crushable energy absorbing element is attached can be a hydraulic recline lock assembly for the passenger seat. In some embodiments, this hydraulic lock can be attached indirectly with the seat back by way of attachment to an articulating seat pan that is mechanically linked with the seat back. In some other embodiments, the hydraulic lock assembly can be directly connected between a seat frame and the seat back, e.g. in seats that lack an articulating seat pan.

According to certain embodiments of the present disclosure, a passenger seat assembly can include a frame configured to attach rigidly to a passenger compartment floor, a seat bottom connected with the frame, a seat back pivotally connected with the frame and operable to recline, and a linkage for a recline lock that is operable to adjust and maintain the recline position of the seat back. The linkage is connected between a nonmoving part of the passenger seat (e.g. the seat frame) and a moving part of the passenger seat (e.g., the reclinable seat back or an articulating seat pan connected with the seat back), and includes an extended portion that extends beyond an attachment point of the linkage to either one of the parts of the seat. A crushable energy absorbing element is mounted around the extended portion of the linkage and fixed relative to an end of the linkage, and the energy absorbing element is configured to receive compressive force between the linkage and an attachment element when the seat back is pushed forward.

According to some embodiments, the seat bottom includes an articulating seat pan connected with the seat back below a pivot axis of the seat back, such that the seat bottom moves aft in response to forward tilting of the seat back, and the linkage is connected to the seat bottom by a first attachment element and connected to the frame by a second attachment element. According to some other embodiments, where the seat bottom is fixed relative to the frame, the linkage can be connected to the seat back below a pivot axis of the seat back by a first attachment element, and connected to the frame by a second attachment element.

According to some embodiments, the passenger seat assembly can include a breakaway fuse that connects the lower portion of the seat back with the seat bottom, the breakaway fuse configured to break and mechanically delink the seat back from the seat bottom when subjected to force in excess of a threshold. The passenger seat assembly may also include a breakaway fuse that functions as an intermediate stop to prevent excess forward motion of the seat back, but that gives under sufficient force to allow the seat back to break forward when subjected to impact. In some embodiments, the energy absorbing assembly can substantially obviate the need for a breakaway fuse by providing controlled deceleration during an impact event. In some embodiments, the energy absorbing assembly is operable to decelerate the seat back when a top portion of the seat back is pushed forward with a force of 1.5 kN (350 lb. force), preferably 1.4 kN (325 lb. force), preferably 1.1 kN (250 lb. force), and more preferably 0.9 kN (200 lb. force), by compression of the crushable energy absorbing element absorbing kinetic energy.

According to some embodiments, the passenger seat assembly can include an energy absorbing strut that includes a strut rod and housing containing an additional energy absorbing element therein. The strut rod is received in the strut housing to create a strut that is rigid in compression, but that can be extended when subjected to tension. The energy absorbing element is contained between a flanged element that extends radially outward from the strut and a collar that extends radially inward from the strut housing to circumscribe the strut rod. In use, the energy absorbing element is subjected to compressive force when tension is applied to the strut rod. When the tension exceeds a crush strength of the energy absorbing element, the energy absorbing element undergoes plastic deformation as the energy absorbing strut extends, absorbing kinetic energy and decelerating the passenger seat assembly.

According to certain embodiments of the present disclosure, a method of installing an energy absorbing device in a passenger seat can include connecting a first end of a linkage comprising a recline lock with one of a reclinable seat back or seat bottom of the passenger seat by a first attachment element, and connecting a second end of the linkage with a rigid frame of the passenger seat by a second attachment element, wherein one of the first or second ends of the linkage protrudes through the first or second attachment element forming an extended portion of the linkage. A crushable energy absorbing element can be installed around the extended portion of the linkage beyond the one of the first or second attachment elements with respect to a remainder of the linkage, and thus positioned in the mechanical path of force exerted by the seat back when the seat back is pushed forward. Such methods can further include removing a breakaway fuse from a joint between the reclinable seat back and seat bottom of the passenger seat, or from an interface between the reclinable seat back and the frame, the breakaway fuse being substantially obviated by the energy absorbing element.

BRIEF DESCRIPTION OF THE DRAWINGS

FIG. 4A is a side section view showing detailed aspects of the passenger seat of FIG. 3 prior to an impact event with the energy absorbing assembly in an initial state.

FIG. 4B is a side section view showing detailed aspects of the passenger seat of FIG. 3 with the energy absorbing assembly in a final state.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide an energy absorbing assembly for passenger seats. While the energy absorbing assemblies are discussed for use with aircraft seats, they are by no means so limited. Rather, embodiments of the energy absorbing assemblies may be used in passenger seats or other seats of any type or otherwise as desired.

Figure 1:
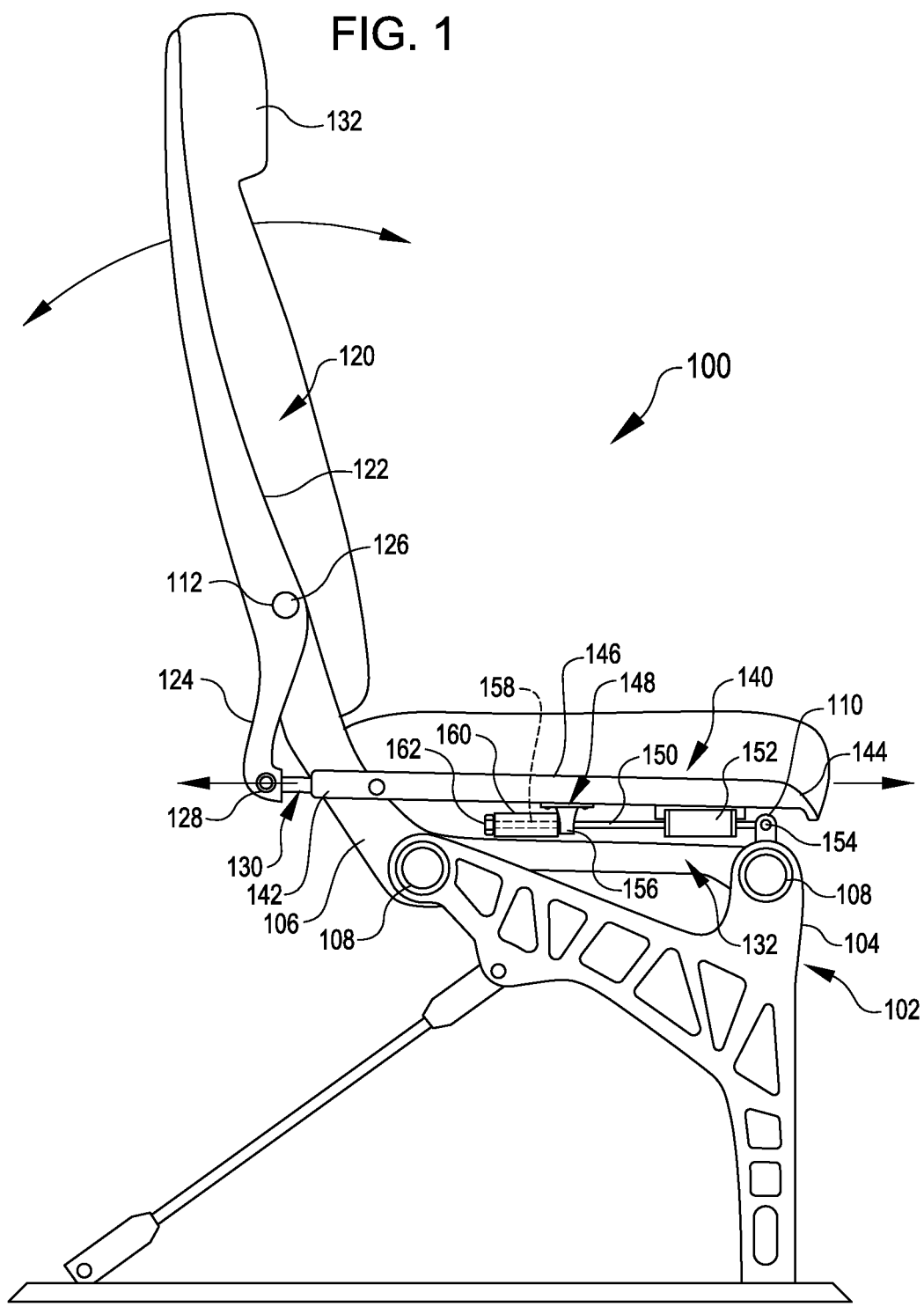
FIG. 1 is a side section view showing a first example of a passenger seat with an energy absorbing assembly, according to certain embodiments of the present disclosure.

According to certain embodiments of the present invention, as shown in FIG. 1, an energy absorbing assembly for a passenger seat can include a seat assembly 100 that includes a frame 102, seat back 120, seat pan 140, and a recline lock assembly 132 with an energy absorbing element 160 that mechanically connects movable reclining elements of the passenger seat assembly with the frame. The frame 102 can include a base frame 104 and seat frame 106 connected together by a series of structural tubes 108, although various other configurations are within the spirit of this disclosure. As described herein, the frame 102 refers to all components that are fixed with respect to the passenger cabin when the seat assembly 100 is installed.

The moving elements of the seat assembly 100, e.g. the seat back 120 and seat pan 140, are mechanically linked to the frame by one or more pivoting or sliding connections (e.g., pivot point 112 about which the seat back pivots). The seat back 120 is attached with the frame 102 by a pivot element 126 at the pivot point 112. An upper portion 122 of the seat back 120 is positioned to support most of a passenger's back, and a lower portion 124 of the seat back acts as a lever arm connected with the seat pan 140 at a lower attachment element 128 by a pivoting linkage 130. In some embodiments, the pivoting linkage 130 can include a breakable fuse so that, in the event of excess force on the seat back 120, the seat back and seat pan 140 can be decoupled by allowing the fuse to break.

In embodiments having an articulating seat pan, the seat pan 140 can be connected by the pivoting linkage 130 with the seat back at or near an aft portion 142 of the seat pan. The seat pan 140 may be slidingly connected with the frame 102, or may be attached with the frame by way of another pivoting connection (not shown) proximate the forward end 144 of the seat pan, with the result that that platform 146 can shift forwards or aft in tandem with the recline of the seat back 120.

The relative tilt of the seat back and the forward/aft position of the seat pan 140 to which the seat back is connected can be controlled by way of the recline lock assembly 132. In conventional passenger seat assemblies, the recline lock assembly 132 includes a linkage or rod 150 that connects with a hydraulic piston 152. A release mechanism (not shown) can be used by a passenger to temporarily allow fluid flow within the piston in order to unlock the seat, and to cut off fluid flow to lock the seat in position. This linkage 150 and piston 152 are mechanically positioned in the path of any force exerted on the seat back, and can typically resist extremely high compressive force. The recline lock assembly 132 is attached with the frame 102 by way of a first attachment element 110 at a first end 154 of the recline lock assembly, and attached with the movable parts of the seat assembly 100 by way of a second attachment element 148 at a second end 156 of the recline lock assembly. An extension of the recline lock assembly 158 passes through the second attachment element 148, through an energy absorbing element 160 that wraps around the rod or linkage 150, and terminates at a flanged element or rigid connector 162, e.g. an end cap, nut and washer, or the like, that firmly secures the energy absorbing element to the extension. The mechanism by which the energy absorbing element 160 interacts with the seat assembly 100 is described with reference to FIGS. 2A-2B.

Figure 2A:
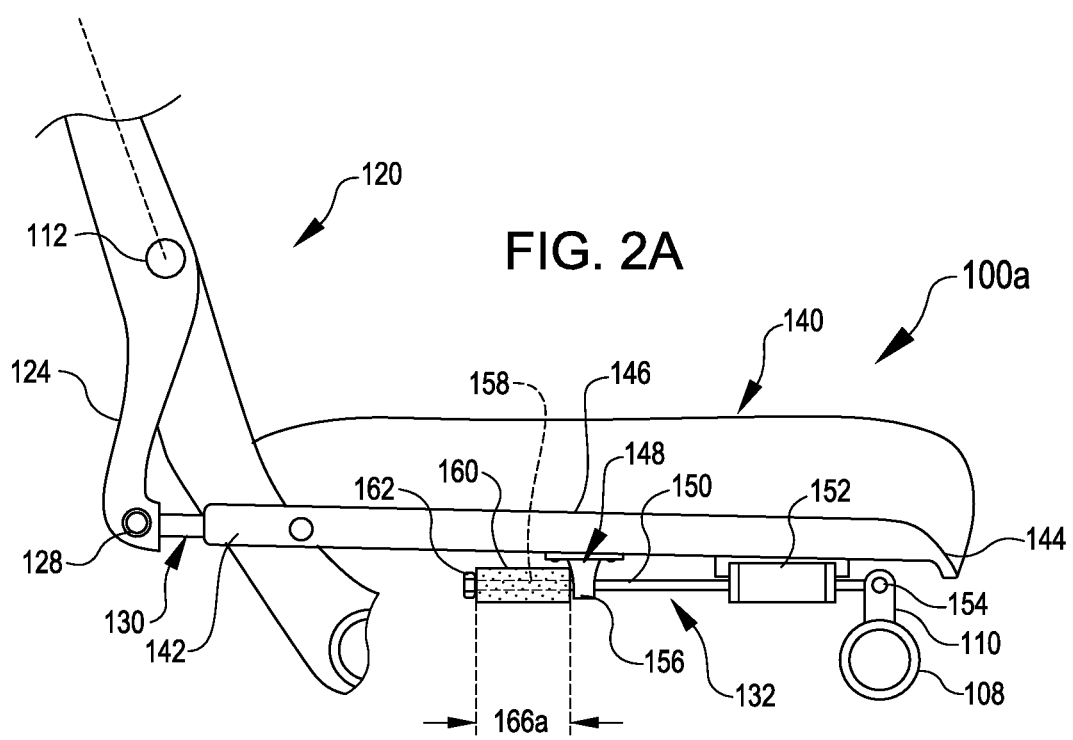
FIG. 2A is a side section view showing detailed aspects of the passenger seat of FIG. 1 prior to an impact event with the energy absorbing assembly in an initial state.

FIG. 2A is a side section view showing detailed aspects of the passenger seat assembly 100 of FIG. 1 prior to an impact event with the energy absorbing assembly in an initial state 100*a*, and the energy absorbing element 160 having an initial uncrushed length 166*a*. The seat back 120 is shown in a substantially upright position, but it will be understood that the recline lock assembly 132 can vary in length, allowing the initial position of the seat back 120 to vary between upright and reclined. During normal operation of the seat, the ordinary forces exerted by a seated passenger or surrounding passengers are generally insufficient to change the recline position, without first unlocking the recline lock 152, or to deform the energy absorbing element 160.

Figure 2B:
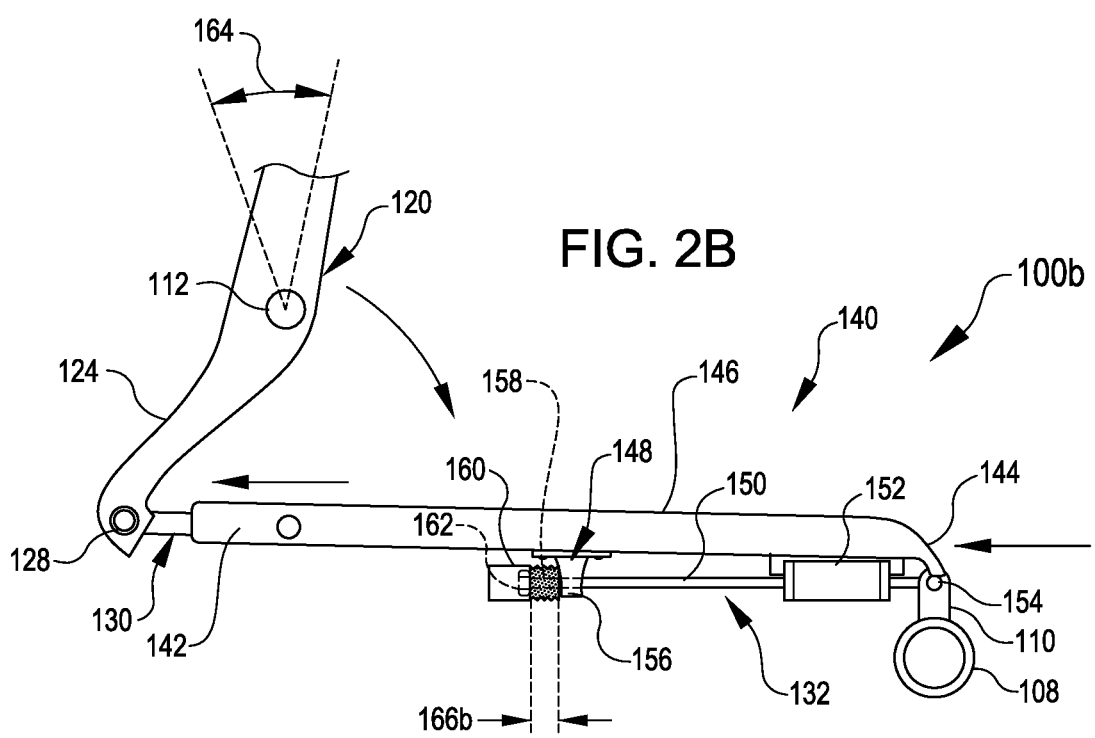
FIG. 2B is a side section view showing detailed aspects of the passenger seat of FIG. 1 with the energy absorbing assembly in a final state.

FIG. 2B is a side section view showing detailed aspects of the passenger seat assembly 100 of FIG. 1 with the energy absorbing assembly in a final state 100*b*, the energy absorbing element 160 having a final, crushed length 166*b*. The energy absorbing element 160 may include portions that do not deform, such as an outer shell, that may extend beyond the crushed portion as shown. In an impact event, collision by a passenger with the back of a passenger seat can exert force on the seat back 120, causing the seat back to rapidly tilt forward by a nonzero angle 164 relative to the upright position. In some embodiments, the forward motion of the seat back is limited to about 20 degrees with respect to the original upright position. This forward tilt of the seat back 120 causes the lower portion 124 of the seat back to pivot aft relative to the pivot point 112, pulling the articulating seat pan 140 backward as well. The seat pan 140 is connected in the forward/aft direction to the frame 102 by way of the recline lock mechanism 132, and therefore transfers mechanical force along this pathway. The energy absorbing element 160, positioned along the recline lock mechanism, is deformed by this mechanical force from its initial length 166*a* to its final length 166*b*, in the process absorbing kinetic energy from the seat 100, thus helping to absorb kinetic energy by catching and decelerating the passenger.

Figure 3:
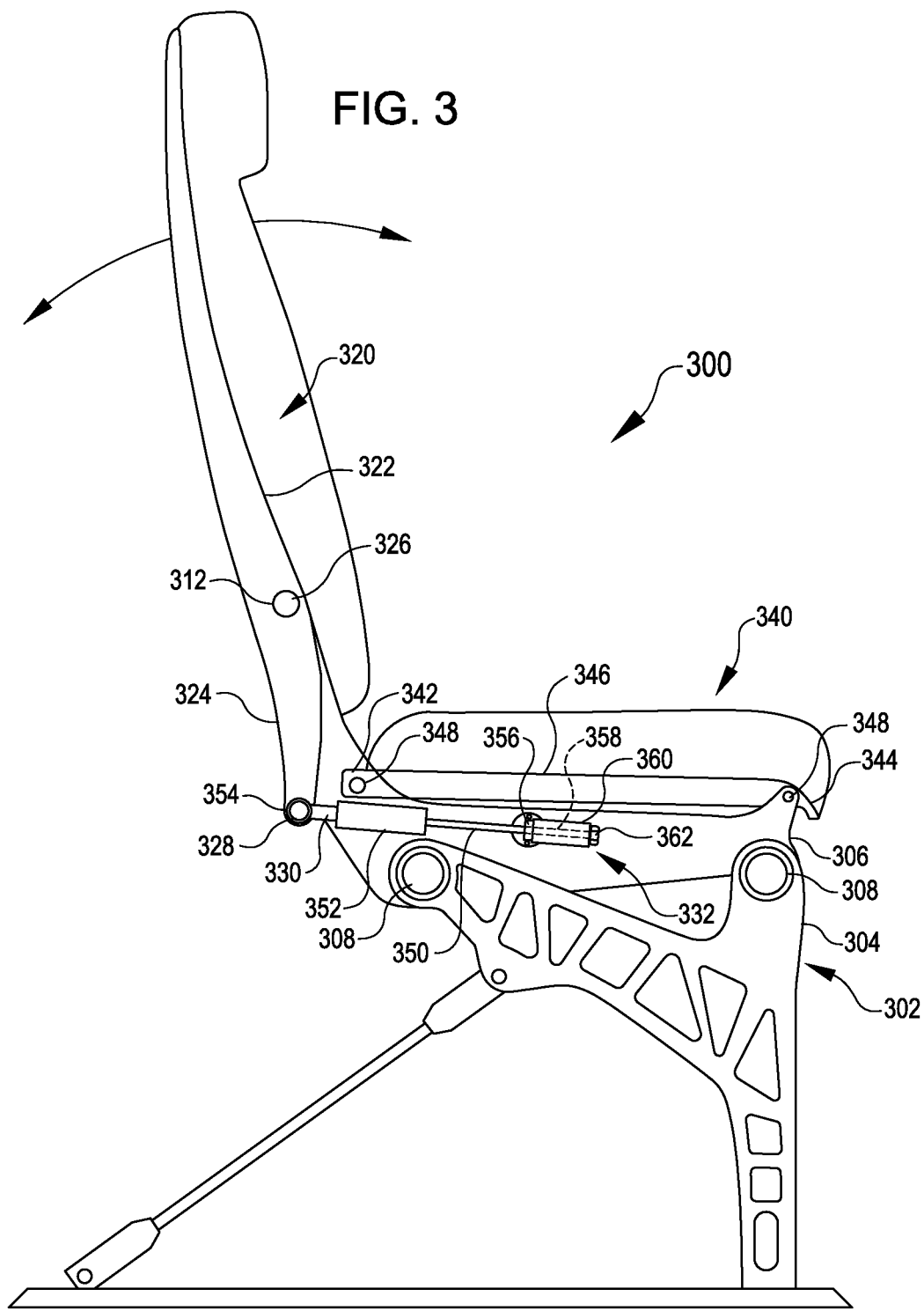
FIG. 3 is a side section view showing a second example of a passenger seat with an energy absorbing assembly, according to certain embodiments of the present disclosure.

The principles described above for absorbing energy by an assembly along the mechanical path of the recline mechanism can be applied also in reclining passenger seats that do not have an articulating seat pan. For example, FIG. 3 is a side section view showing a second example of a passenger seat assembly 300 with an energy absorbing element 360, according to certain embodiments of the present disclosure.

Similar to seat assembly 100, seat assembly 300 includes a frame 302, seat back 320, seat pan 340, and a recline lock assembly 332 with an energy absorbing element 360 that mechanically connects movable reclining elements of the passenger seat assembly with the frame. The frame 302 can include a base frame 304 and seat frame 306 connected together by a series of structural tubes 308, although various other configurations are within the spirit of this disclosure.

Seat assembly 300 differs from seat assembly 100 in that the seat back 320 can recline without actuating the seat pan 340. The seat back 320 is mechanically linked to the frame 302 by pivoting element 326 at pivot point 312. An upper portion 322 of the seat back 320 is positioned to support most of a passenger's back, and a lower portion 324 of the seat back acts as a lever arm connected directly with the recline lock assembly 332. The seat pan 340 may be rigidly connected with the frame 302, e.g. by attachment elements 348 proximate the forward and/or aft ends 344, 342 of the seat pan, with the result that that platform 346 is static when a passenger reclines.

The relative tilt of the seat back 120 can be controlled by way of the recline lock assembly 332. The recline lock assembly 332 includes a linkage or rod 350 that connects with a hydraulic piston 352 as described above with respect to recline lock assembly 132. A first attachment element 354 of the recline lock assembly 332 is connected with a pivoting linkage 330 attached at a pivot point 228 of the lower portion 324 of the seat back 120. A second attachment element 356 connects the recline lock assembly 332 to the frame 302. An extension of the recline lock assembly 358 passes through the second attachment element 348, through an energy absorbing element 360 that wraps around the rod or linkage 350, and terminates at a flanged element or other rigid connector 362, e.g. an end cap, nut and washer, or the like, that firmly secures the energy absorbing element to the extension. Although reversed in direction compared to the recline lock assembly 132 of FIGS. 1-2B, the energy absorbing element 360 operates in the same way as energy absorbing element 160. The mechanism by which the energy absorbing element 360 interacts with the seat assembly 300 is described with reference to FIGS. 4A-4B.

FIG. 4A is a side section view showing detailed aspects of the passenger seat assembly 300 of FIG. 3 prior to an impact event with the energy absorbing assembly in an initial state 300*a*, and the energy absorbing element 360 having an initial uncrushed length 366*a*. In this embodiment, as discussed above, the seat back 320 can also vary in position prior to an impact event when the recline lock assembly 332 is unlocked. Certain elements, such as the seat pan 340, are omitted for clarity, as the recline lock assembly 332 attaches between the seat back 320 and seat frame 302 without an intervening mechanical connection to the seat pan.

FIG. 4B is a side section view showing detailed aspects of the passenger seat assembly 300 of FIG. 3 with the energy absorbing assembly in a final state 300*b*, the energy absorbing element 360 having a final, crushed length 366b. In an impact event, collision by a passenger with the back of a passenger seat can exert force on the seat back 320, causing the seat back to rapidly tilt forward by a nonzero angle 364, which can be forward beyond the upright position by up to 20 degrees, or more. This forward tilt of the seat back 320 causes the lower portion 324 of the seat back to pivot aft relative to the pivot point 312, pulling on the recline lock mechanism 332. The energy absorbing element 360, positioned along the recline lock mechanism, is deformed by this mechanical force from its initial length 366a to its final length 366b, in the process absorbing kinetic energy from the seat 300, thus helping to absorb kinetic energy by catching and slowing the passenger. The recline lock assembly 332 and energy absorbing element 360 are mechanically connected along the path in which the seat back 320 exerts mechanical force on the frame 302, similar to the embodiment described above with reference to FIGS. 1-2B, without an intervening mechanical linkage to an articulating seat pan.

Figure 5:
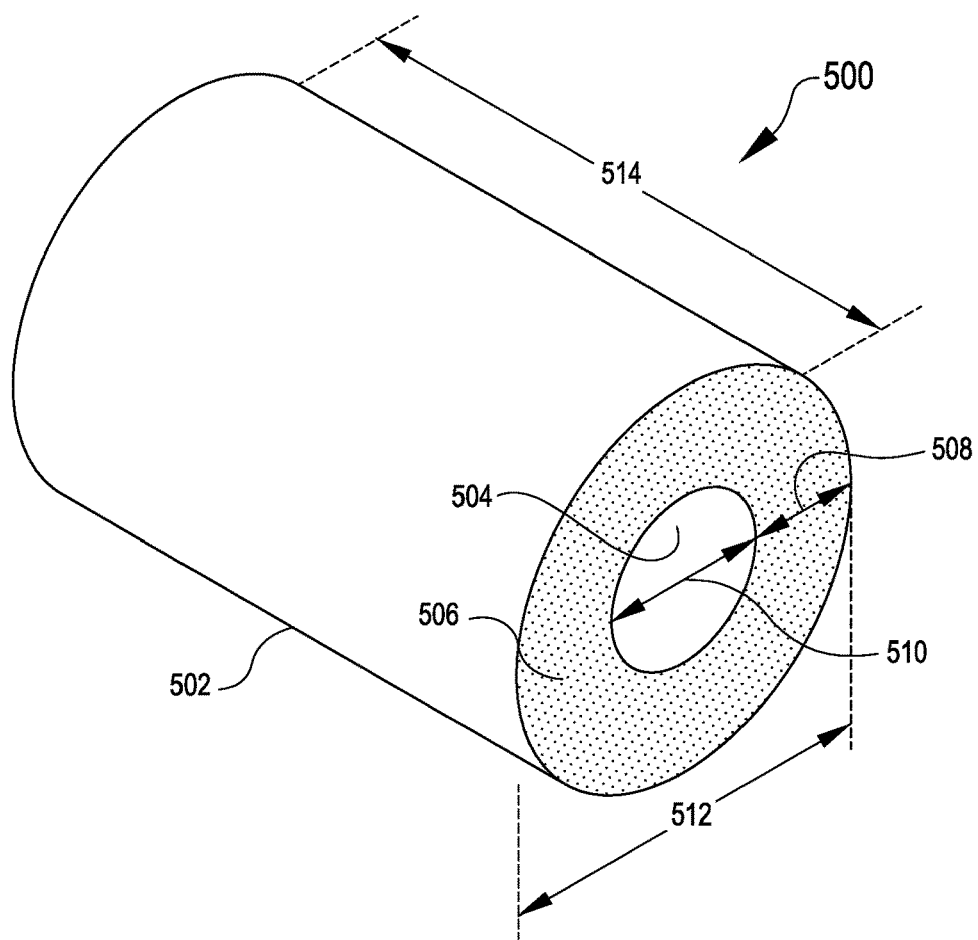
FIG. 5 is a perspective view of an energy absorbing element for inclusion in an energy absorbing assembly of FIGS. 1-4B, according to various embodiments.

The effectiveness of the energy absorbing mechanisms described herein can be tuned by adjusting the size, shape, and crush strength of the energy absorbing elements, or by changing the dimensions and leverage associated with the seat back and recline lock assemblies. FIG. 5 is a perspective view of an energy absorbing element 500 for inclusion in any of the energy absorbing assemblies of FIGS. 1-4B, according to various embodiments. Energy absorbing element 500 includes an outer wall 502, an inner wall 504 with an inner diameter 510 sized to receive a linkage or rod therethrough, and an energy absorbing matrix 506 between the two walls. According to some embodiments, the energy absorbing matrix 506 can be a metal honeycomb or corrugated structure, typically aluminum or a comparably malleable material, but a variety of other materials can be used including, but not limited to, foamed materials (e.g. polymeric, composite, or metallic foams). In operation, the energy absorbing matrix is subjected to a crushing force in an impact that deforms the matrix, thus performing mechanical work that absorbs kinetic energy from the impact.

The crush strength of the energy absorbing element 500 and the distance over which it can deform to absorb energy impact both the amount and the rate at which it can absorb energy. For example, an energy absorbing element defined by a relatively small internal diameter 510 and large outer diameter 512 will have a large cross sectional area of crushable energy absorbing matrix, and thus a higher resistance to crushing. By varying the width 508 of the annulus, or the density of energy absorbing matrix therein, the properties of the energy absorbing element 500 can be tuned.

According to some embodiments, the initial uncrushed length 514 of suitable energy absorbing element 500 can vary from about 2.5-25 cm (1-10"), or 5-12.5 cm (2-5"), or other suitable length; and can compress by at least 60%, preferably 75% of its initial length while absorbing energy. Various crush strengths and crush strength profiles can be used. For example, in some embodiments, the energy absorbing element 500 deforms continually when subjected to a force exceeding a particular threshold, e.g., by plastic deformation when subjected to a crushing force of 6.67 kN (1500 lb. force), or in some embodiments by 5.0 kN (1,125 lb. force), or 2.6 kN (600 lb. force). When connected with a seat recline lock mechanism, in which the seat back acts as a lever arm that multiplies mechanical force against the energy absorbing element, these crush forces translate to approximate forces at the seat back on the order of 1.5 kN (350 lb. force), preferably 1.4 kN (325 lb. force), preferably 1.1 kN (250 lb. force), and more preferably 0.9 kN (200 lb. force).

Figure 6:
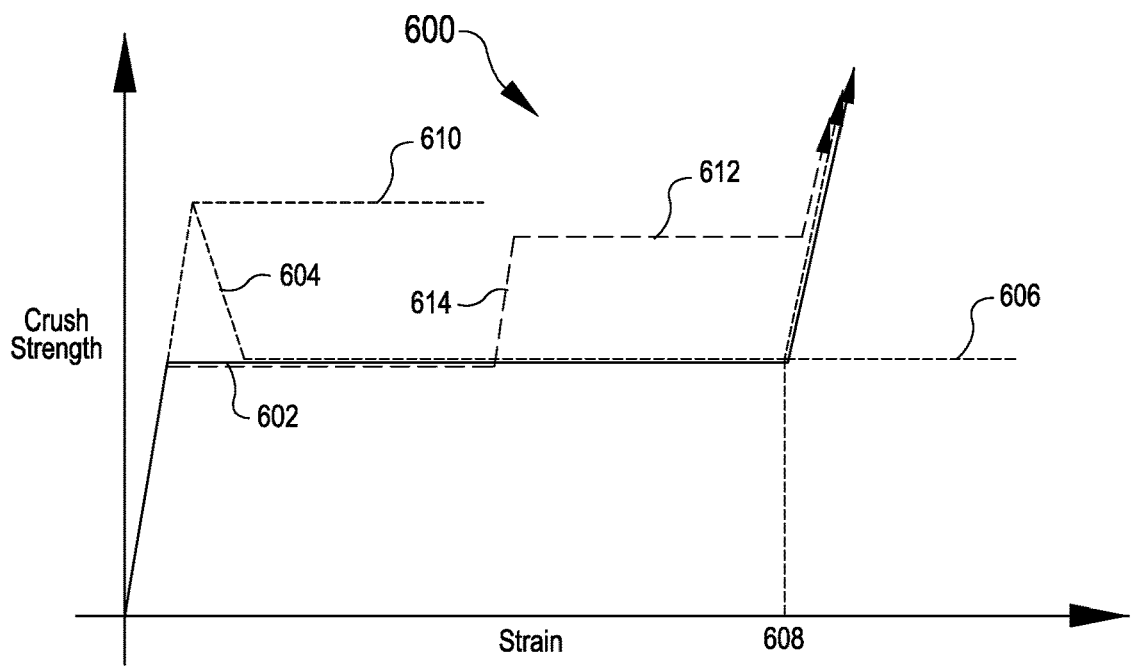
FIG. 6 is a graphical representation of the crush strength of an energy absorbing element as a function of strain, according to various embodiments.

FIG. 6 is a stress/strain curve 600 illustrating the crush strength of an energy absorbing element as a function of strain, according to various embodiments. A first curve 602 illustrates a simple step curve, in which subjecting the energy absorbing element to a compressive force that exceeds its active crush strength 606 will cause it to compress continually until the energy absorbing matrix is fully compressed at the strain limit 608. This type of response can be generated in pre-stressed energy absorbing elements, and results in linear absorption of energy by the energy absorbing element as reflected by the area under the curve. A second curve 604 illustrates a crush profile having an initial peak, which is desirable for embodiments having a low crush strength, as the initial resistance to crushing may help to prevent inadvertent damage to the energy absorbing element by rough handling. The initial peak 610 can also be tuned to exceed specific tolerances for handling, while meeting impact safety criteria. In addition, changing the structure of the energy absorbing matrix can influence the profile with which energy is absorbed so that energy absorption is nonlinear. For example, a third curve 612 illustrates a stepped strength response caused by including multiple regions of crushable, energy absorbing matrix in the energy absorbing element. When one region is fully compressed, the crush strength of the energy absorbing element increases in a step 614, until the entire energy absorbing element is compressed at the strain limit 608. Various other performance curves are possible by varying the structure of the energy absorbing element, including increasing crush strength, decreasing crush strength, and profiles having multiple steps.

Figure 7:
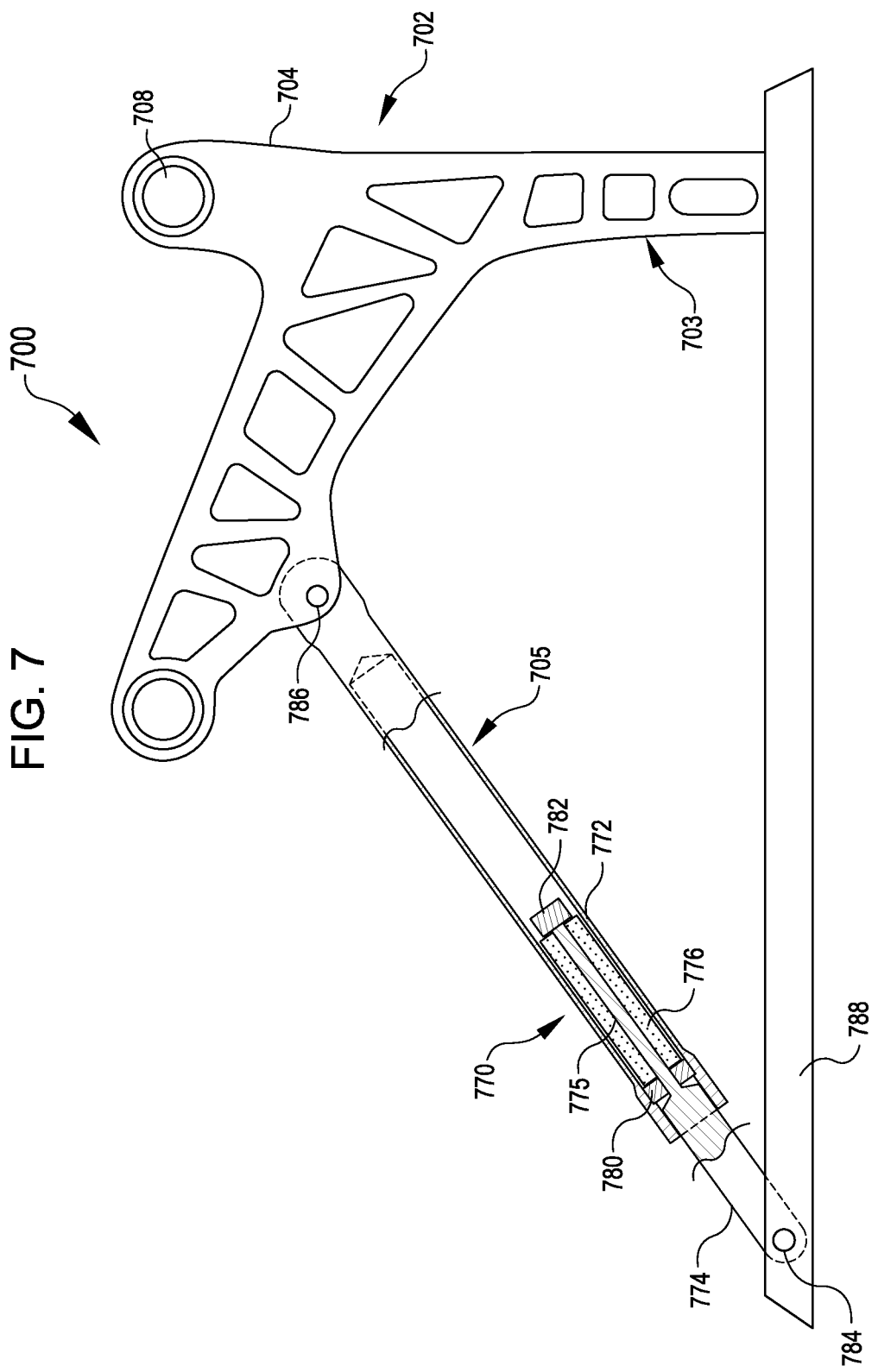
FIG. 7 is a side section view showing an example of a passenger seat assembly incorporating an energy absorbing strut in the frame thereof.

FIG. 7 is a side section view showing an example of a passenger seat assembly 700 incorporating an energy absorbing frame 702. The frame 702, similar to frame 102 (FIG. 1) includes a base frame 702 that can connect with any suitable set of seat components as described above, including both seat assemblies with articulating seat pans (e.g., FIGS. 1-2B) and seat assemblies with stationary seat pans (FIGS. 3-4B), and also with seat assemblies that do not include reclining seat backs. The energy absorbing frame 702 includes a crushable energy absorbing element 776 that can include any of the features of other energy absorbing elements 160, 360 described herein with reference to the energy absorbing recline lock assemblies 132, 332 (FIGS. 1-4B).

The frame 702 includes a base frame 704 composed of forward struts 703 and aft struts 705 that support the seat assembly 700, according to various embodiments of the present disclosure. The forward and aft struts 703, 705 can connect with a substructure 788 attached to a cabin floor, or may be attached directly to a cabin floor. In the example as shown, only the aft strut 705 is energy absorbing; but it will be understood that the components of the seat assembly 700 can be assembled in a reversed direction by assembling the energy absorbing elements in the forward strut; or that the seat assembly can include energy absorbing elements connecting the seat assembly with the cabin floor at both the forward and aft ends.

The energy absorbing assembly 770 of the rear strut 705 includes a strut rod 774 and a strut housing 772 that at least partly encompasses the strut rod therein. In the illustrated configuration, the strut rod 774 connects with the substructure 788 by a lower attachment point 784 at the cabin floor; and the strut housing 772 connects with the base frame 704 at an upper attachment point 786 at the base frame. However, the orientation of the strut rod and strut housing can be reversed without changing the operation of the assembly. The energy absorbing assembly 770 includes the energy absorbing element 776, which is positioned within the strut housing 772 and connected with, and typically around, the strut rod 774.

The energy absorbing element 776 is constrained between a flanged element 782 that extends radially from the strut rod 772, and a collar 780 that extends radially inward from the strut housing 772, typically adjacent or proximate to a necked portion 778 of the strut rod, where the strut rod narrows to interface with the energy absorbing element 776. The collar 780 can be an integral part of the strut housing 772, or can be connected thereto as a separate part. The collar 780 can also act as a rigid stop to prevent the rear strut 705 from decreasing in length when subjected to the weight of the seat assembly 700. The energy absorbing assembly 770 acts to reduce the effect of deceleration on a seated passenger by deforming while resisting force in tension when the aft strut 705 is pulled, e.g. by impact forces acting on the seat assembly 700 and tilting the assembly forward.

Structural elements of the seats (e.g. passenger seat 100 and the frame 102, seat bottom 140 and seat back 120), as well as any intervening structural elements or attachment elements therein, may be formed of materials including but not limited to aluminum, stainless steel, aramid fibers, polycarbonate, polypropylene, other metallic materials, composite materials, or other similar materials.

In the following, further examples are described to facilitate the understanding of the invention:

Example A. An energy absorbing assembly for a passenger seat, the assembly comprising: a linkage having a linkage first end and a linkage second end, the linkage first end configured to rigidly connect with a first attachment element of a reclinable passenger seat and the linkage second end configured to pass through a second attachment element of the reclinable passenger seat, wherein one of the first and second attachment elements is mounted to a rigid structural element of the passenger seat and the other of the first and second attachment elements is mounted to either an articulating seat pan or seat back of the passenger seat, the linkage second end further comprising an extended portion that extends beyond the second attachment element when positioned therethrough; and a crushable energy absorbing element mounted around the extended portion of the linkage and fixed relative to the second end of the linkage, the energy absorbing element configured to receive compressive force by the first or second attachment element when the assembly is mounted to the passenger seat and a seat back of the passenger seat is pushed forward.

Example B. The energy absorbing assembly of example 1, wherein the crushable energy absorbing element is a cylindrical energy absorber comprising an internal opening sized to accommodate the linkage, a crushable matrix surrounding the internal opening, and an external shell configured to contain the crushable matrix when the matrix is compressed.

Example C. The energy absorbing assembly of any of the preceding examples, wherein the crushable energy absorbing device is positioned to abut the second structural element at a first end of the energy absorbing device, and wherein the energy absorbing device is fixed to the linkage at a second end of the energy absorbing device opposite the first end.

Example D. The energy absorbing assembly of any of the preceding examples, wherein the linkage comprises a hydraulic recline lock for the passenger seat.

Example E. The energy absorbing assembly of any of the preceding examples, wherein the crushable energy absorbing device has an initial length of from 2.5-25 cm (1-10"), or 5 to 12.5 cm (2" to 5"), or other suitable length and can compress by at least 60%, preferably 75% of its initial length while absorbing energy.

Example F. The energy absorbing assembly of any of the preceding examples, wherein the crushable energy absorbing device absorbs energy by plastic deformation when subjected to a crushing force of 6.67 kN (1500 lb. force), preferably 5.0 kN (1,125 lb. force), more preferably 2.6 kN (600 lb. force) in compression.

Example G. The energy absorbing assembly of the preceding example, wherein the crushable energy absorbing device has an initial resistance to compression that is higher than the crushing force.

Example H. The energy absorbing assembly of any of the preceding examples, wherein the crushable energy absorbing device comprises a first section of crushable matrix configured to deform in a first stage when the energy absorbing device is subjected to a first compressive force, and a second section of crushable matrix configured to further deform in a second stage when subjected to a second compressive force exceeding the first compressive force, the first and second stages corresponding to an increasing resistance to compression by the energy absorbing device as the energy absorbing device is compressed.

Example I. A passenger seat assembly, comprising: a frame configured to attach rigidly to a passenger compartment floor; a seat bottom connected with the frame; a seat back pivotally connected with the frame and operable to recline; and a linkage comprising a recline lock for locking a recline position of the seat back, the linkage mechanically connected with the seat back and the frame by a first attachment element and a second attachment element, respectively, the linkage comprising an extended portion that extends beyond either the first attachment element or the second attachment element distal from a remainder of the linkage; and a crushable energy absorbing element mounted around the extended portion of the linkage and fixed relative to the first or second end of the linkage, the energy absorbing element configured to receive compressive force by the first or second attachment element when the seat back is pushed forward.

Example J. The passenger seat assembly of the preceding example, wherein: the seat bottom comprises an articulating seat pan connected with the seat back below a pivot axis of the seat back, such that the seat bottom moves aft in response to forward tilting of the seat back; and the linkage is connected to the seat bottom by the first attachment element and connected to the frame by the second attachment element.

Example K. The passenger seat assembly of any of the preceding examples, wherein the seat back further comprises a breakaway fuse pivotally connecting the lower portion of the seat back with the seat bottom, the breakaway fuse configured to break and mechanically delink the seat back from the seat bottom when subjected to force in excess of a threshold.

Example L. The passenger seat assembly of any of the preceding examples, wherein: the seat bottom is fixed relative to the frame; and the linkage is connected to the seat back below a pivot axis of the seat back by the first attachment element, and connected to the frame by the second attachment element.

Example M. The passenger seat assembly of any of the preceding examples, wherein the crushable energy absorbing element is a cylindrical energy absorber comprising an internal opening sized to accommodate the linkage, a crushable matrix surrounding the internal opening, and an external shell configured to contain the crushable matrix when the matrix is compressed.

Example N. The passenger seat assembly of any of the preceding examples, wherein the assembly is operable to pull the extended portion of the linkage through the second attachment element when a top portion of the seat back is pushed forward with a force of 1.5 kN (350 lb. force), preferably 1.4 kN (325 lb. force), preferably 1.1 kN (250 lb. force), and more preferably 0.9 kN (200 lb. force), by causing compression of the crushable energy absorbing element between the first or second end of the linkage and the second attachment element.

Example O. The passenger seat assembly of any of the preceding examples, wherein the crushable energy absorbing element is configured to deform in a first stage at a first rate, and in a second stage at a second rate that is slower and absorbs more energy than the first stage, the first and second stages corresponding to an increasing resistance to compression by the energy absorbing device as the energy absorbing device is compressed.

Example P. The passenger seat assembly of any of the preceding examples, wherein the seat back is limited to a 20 degree forward tilt from an initial, upright position, which can be a vertical position.

Example Q. The passenger seat assembly of any of the preceding examples, wherein the frame comprises an energy absorbing strut comprising: a strut rod comprising a flanged element; a strut housing that receives the strut rod and further comprising a collar that circumscribe the strut rod at a nonzero distance from the flanged element; and a second energy absorbing element connected with the strut rod within the strut housing and maintained between the flanged element and the collar such that, in response to extension of the energy absorbing strut, the flanged element and collar act in compression on the second energy absorbing element.

Example R. The passenger seat assembly of the preceding example, wherein the second energy absorbing element comprises a second cylindrical energy absorber comprising a second crushable matrix.

Example S. A method of installing an energy absorbing device in a passenger seat, the method comprising: connecting a first end of a linkage comprising a recline lock with one of a reclinable seat back or seat bottom of the passenger seat by a first attachment element; connecting a second end of the linkage with a rigid frame of the passenger seat by a second attachment element, wherein one of the first or second ends of the linkage protrudes through the first or second attachment element forming an extended portion of the linkage; mounting a crushable energy absorbing element around the extended portion of the linkage beyond the one of the first or second attachment elements with respect to a remainder of the linkage; and connecting a distal end of the crushable energy absorbing device to the extended portion of the linkage such that the crushable energy absorbing device is maintained abutting the one of the first or second attachment elements and such that the crushable energy absorbing element is configured to receive compressive force by the one of the first or second attachment elements when the seat back is pushed forward.

Example T. The method of the preceding example, further comprising removing a breakaway fuse from a joint between the reclinable seat back and seat bottom of the passenger seat.

Example U. The method of any of the preceding examples, wherein the seat bottom comprises an articulating seat pan connected with the seat back below a pivot axis of the seat back, such that the seat bottom moves aft in response to forward tilting of the seat back, the method further comprising: connecting the first end of the linkage with the seat bottom.

Example V. The method of any of the preceding examples, wherein the seat bottom wherein the seat bottom is fixed relative to the frame, the method further comprising: connecting the first end of the linkage with a lower portion of the reclinable seat back below a pivot axis of the seat back.

Example W. A passenger seat assembly, comprising: a frame configured to attach to a passenger compartment floor; a seat bottom connected with the frame; and a seat back connected with the frame, wherein the frame further comprises an energy absorbing strut comprising: a strut rod comprising a flanged element; a strut housing that receives the strut rod and further comprising a collar that circumscribe the strut rod at a nonzero distance from the flanged element; and an energy absorbing element connected with the strut rod within the strut housing and maintained between the flanged element and the collar such that, in response to extension of the energy absorbing strut, the flanged element and collar act in compression on the energy absorbing element.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seat assembly, comprising:
a frame configured to attach rigidly to a passenger compartment floor;
a seat bottom connected with the frame and comprising an articulating seat pan connected with the seat back below a pivot axis of the seat back, such that the seat bottom moves aft in response to forward tilting of the seat back;
a seat back pivotally connected with the frame and operable to recline; and
a linkage comprising a recline lock for locking a recline position of the seat back, the linkage mechanically connected with one of the seat back and the frame by a first attachment element, and to the other of the seat back and the frame by a second attachment element, the linkage connected to the seat bottom by one of the first or second attachment elements and connected to the frame by the other of the first or second attachment elements, the linkage comprising an extended portion that extends through the second attachment element; and
a crushable energy absorbing element mounted to the extended portion of the linkage between the second attachment element and second end of the linkage, the energy absorbing element positioned to receive compressive force between the second end of the linkage and the second attachment element in response to forward motion of the seat back.

2. The passenger seat assembly of claim 1, wherein the seat back further comprises a breakaway fuse pivotally connecting a lower portion of the seat back with the seat bottom, the breakaway fuse configured to break and mechanically delink the seat back from the seat bottom when subjected to force in excess of a threshold.

3. The passenger seat assembly of claim 1, wherein the crushable energy absorbing element is a cylindrical energy absorber comprising an internal opening sized to accommodate the linkage, a crushable matrix surrounding the internal opening, and an external shell containing the crushable matrix.

4. The passenger seat assembly of claim 1, wherein the crushable energy absorbing element is positioned to abut the second attachment element at a first end of the energy absorbing element and to abut a flanged element of the linkage at a second end of the energy absorbing element opposite the first end.

5. The passenger seat assembly of claim 1, wherein the crushable energy absorbing element has an initial length of from 2.5-25 cm (1-10") and can compress by at least 60% of its initial length while absorbing energy.

6. The passenger seat assembly of claim 1, wherein the crushable energy absorbing element absorbs energy by plastic deformation when subjected to a crushing force of 6.67 kN (1500 lb. force) in compression.

7. The passenger seat assembly of claim 6, wherein the crushable energy absorbing element has an initial resistance to compression that is higher than the crushing force.

8. The passenger seat assembly of claim 1, wherein the assembly is operable to compress the crushable energy absorbing element by pulling the extended portion of the linkage through the second attachment element when a top portion of the seat back is pushed forward with a force of 1.5 kN (350 lb. force).

9. The passenger seat assembly of claim 1, wherein the crushable energy absorbing element is configured to deform in a first stage at a first rate, and in a second stage at a second rate that is slower and absorbs more energy than the first stage, the first and second stages corresponding to an increasing resistance to compression by the energy absorbing element as the energy absorbing element is compressed.

10. The passenger seat assembly of claim 1, wherein the crushable energy absorbing element comprises a first section of crushable matrix configured to deform in a first stage when the energy absorbing element is subjected to a first compressive force, and a second section of crushable matrix configured to further deform in a second stage when subjected to a second compressive force exceeding the first compressive force, the first and second stages corresponding to an increasing resistance to compression by the energy absorbing element as the energy absorbing element is compressed.

11. The passenger seat assembly of claim 1, wherein the seat back is limited to a 20 degree forward tilt from vertical.

12. The passenger seat assembly of claim 1, wherein the frame comprises an energy absorbing strut comprising:
 a strut rod comprising a flanged element;
 a strut housing that receives the strut rod and further comprising a collar that circumscribe the strut rod at a nonzero distance from the flanged element; and
 a second energy absorbing element connected with the strut rod within the strut housing and maintained between the flanged element and the collar such that, in response to extension of the energy absorbing strut, the flanged element and collar act in compression on the second energy absorbing element.

13. The passenger seat assembly of claim 12, wherein the second energy absorbing element comprises a second cylindrical energy absorber comprising a second crushable matrix.

14. A method of installing an energy absorbing element in a passenger seat, the method comprising:
 connecting a first end of a linkage comprising a recline lock with a seat bottom of the passenger seat by a first attachment element, wherein the seat bottom comprises an articulating seat pan connected with the seat back below a pivot axis of the seat back, such that the seat bottom moves aft in response to forward tilting of the seat back;
 connecting a second end of the linkage with a rigid frame of the passenger seat by a second attachment element, wherein one of the first or second ends of the linkage protrudes through the first or second attachment element forming an extended portion of the linkage;
 mounting a crushable energy absorbing element to the extended portion of the linkage beyond the one of the first or second attachment elements with respect to a remainder of the linkage; and
 connecting a distal end of the crushable energy absorbing element to the extended portion of the linkage such that the crushable energy absorbing element is maintained abutting the one of the first or second attachment elements and such that the crushable energy absorbing element is configured to receive compressive force by the one of the first or second attachment elements when the seat back is pushed forward.

15. The method of claim 14, further comprising:
 removing a breakaway fuse from a joint between the seat back and seat bottom of the passenger seat.

\* \* \* \* \*